Figure 1:
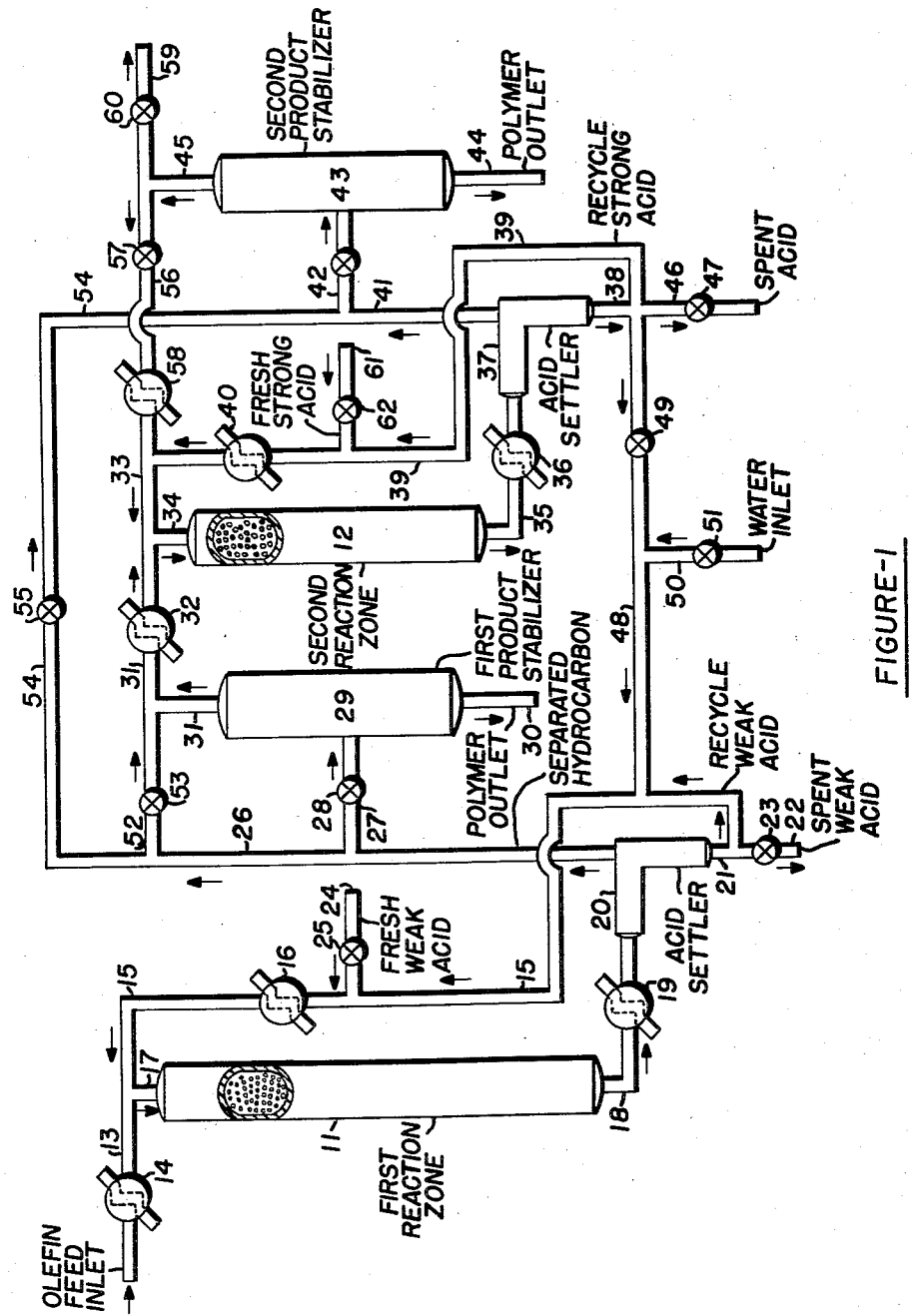

United States Patent Office 2,850,551
Patented Sept. 2, 1958

2,850,551

COMBINATION CATALYTIC POLYMERIZATION PROCESS WITH LIQUID ACIDS OF PHOSPHORUS

Leonard E. Carlsmith, Summit, N. J., assignor to Esso Research and Engineering Company, a corporation of Delaware Application July 31, 1953, Serial No. 371,638

3 Claims. (Cl. 260—683.15)

The present invention relates to an improved process for the catalytic polymerization of olefinic hydrocarbons and the like. More particularly, it relates to a multi-stage polymerization process using liquid acids of phosphorus as catalyst for production of high-octane, motor fuel blending agents.

It is known to manufacture motor gasoline blending agents and the like by polymerizing olefins such as propylene and butylenes in the presence of liquid acids of phosphorus. In conventional operations the olefin to be polymerized is usually contacted in the vapor phase with liquid acid at an elevated temperature and pressure. Relatively strong acids, such as those in the range of about 100 to 110% phosphoric acid, are much more active than the weaker acids. In comparison with the latter, they require less expensive reactor volume and permit more complete conversion of the olefins. It has been found, however, that such strong acid catalysts lead to the formation of relatively large amounts of polymers boiling well above the gasoline boiling range. Furthermore, the octane number of the gasoline fraction decreases as the acid concentration increases. Hence, the process is not commercially attractive when the production of gasoline blending agents is to be maximized.

It has been found, and is a part of the teaching of the present invention, that substantial improvements may be realized in operations employing liquid acids of phosphorus by conducting the polymerization operation in a plurality of steps in which a weak acid is employed in a primary stage and a stronger acid is employed in at least one subsequent stage. The olefin feed stream is passed through the primary stage to polymerize a substantial portion of the olefins. The unreacted olefins in the effluent stream from this first stage are then contacted with the strong acid, and polymerization is substantially completed.

This mode of operation takes advantage of the discovery that weak acids of phosphorus are quite selective in the production of high octane gasoline polymers. Therefore, for a given amount of olefins converted in the first reaction zone, a relatively high yield of gasoline polymer is obtained. However, it is almost impossible under practical conditions to obtain olefin conversions much above 50 to 80% with the weak acids. This invention provides a means for "olefin clean-up"; i. e., polymerizing the unreacted olefins in the presence of a strong acid to take advantage of the relatively low reactor volume required to achieve overall olefin conversions above about 90% to 95%.

In one preferred modification of the present invention, polymers formed in the treatment with weak acid are removed before the unreacted olefins are contacted with the strong acid. This minimizes further reaction or polymerization of this polymer during the subsequent step. Other advantages will become apparent from the following detailed description when taken in conjunction with the drawing.

Figure 1 of the drawing shows a flow diagram of preferred embodiments of the invention.

Figure 2:
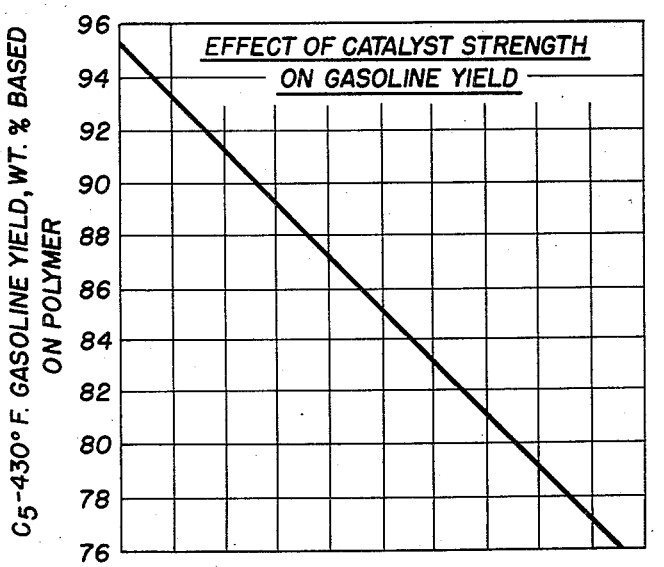
Figure 3:
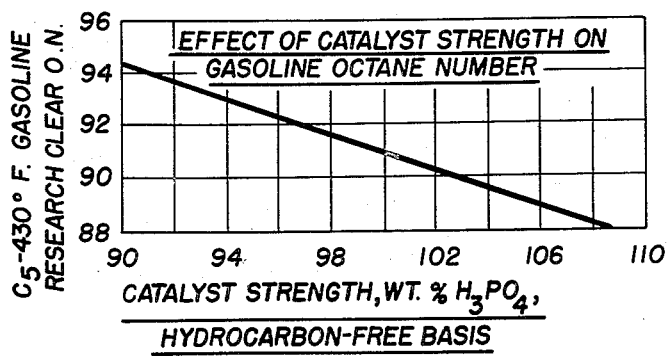

Figures 2 and 3 are graphical representations of the effect of catalyst strength on gasoline yield and gasoline octane number, respectively, when conducting a polymerization operation in accordance with one phase of the present invention.

Turning now to Figure 1, the numeral 11 designates a first reaction zone that uses a weak acid of phosphorus as catalyst, and the numeral 12 designates a second reaction zone that uses a strong acid of phosphorus as catalyst. The terms "weak acid" and "strong acid" as used herein are relative terms. For example, the acid in the second zone may be as little as about 5% to as much as about 40% stronger than that in the first zone.

The liquid acids in these zones may be in the form of a pool or column through which the olefin feed is bubbled. The zones may also consist of contact towers equipped with bell cap trays or other contacting devices permitting liquid acid to flow downwardly from tray to tray followed by recycling the acid to the top of the tower. In the embodiment shown, the towers are provided with solid packing materials such as granular carbon, Berl saddles, Raschig rings, ceramic packing, divided corrosion resistant metals such as copper pellets, or the like. The packed section is flooded with acid catalyst which exists as the continuous phase; hydrocarbon is present as a discontinuous phase. The flow of hydrocarbon and acid is co-current in the embodiment shown, but countercurrent operations may be used to advantage.

A substantially anhydrous olefin feed stream, preferably at an elevated pressure, is introduced into the system through line 13 containing a pre-heater 14. The vaporized feed is combined with weak phosphoric acid passing through line 15 containing heat exchanger 16, and the streams are passed via line 17 into the top of tower 11. The liquid catalyst gravitates down over the packing in the tower, and vaporized olefins are brought into intimate contact therewith under polymerizing temperature, pressure and contact time conditions. A substantial portion of the olefins, such as in the range of about 30 to 80%, preferably 40 to 70%, are converted to polymers.

Liquid catalyst and hydrocarbon effluent are withdrawn from the bottom of the tower through line 18 and are cooled if necessary in heat exchanger 19 in order to condense the hydrocarbon phase. The mixture passes to acid settler 20 wherein the hydrocarbon and acid separate into top and bottom phases. The acid phase is withdrawn through line 21 and is recycled through line 15 to the top of tower 11 as heretofore described. After prolonged use, the activity of the acid may decline to undesirably low levels by contamination with water in the feed, with carbonaceous materials, or from other causes. A portion of the spent acid may be continuously or periodically discarded from the system through line 22 containing control valve 23. Fresh make-up weak acid may be continuously or intermittently introduced into the system through line 24 containing valve 25. This will keep a constant inventory of acid in the first reaction zone system.

The hydrocarbon phase in separator 20, which contains unreacted olefins and polymer, may then follow several different routes before being contacted with strong acid. In a preferred modification, it is passed through line 26 and branch line 27 containing control valve 28 into product stabilizer or product separation zone 29. This stream may be filtered if desired to remove entrained acid before passage to the stabilizer. The stabilizer or product separation zone may be a conventional distillation zone or the like wherein the polymer product is separated and withdrawn through line 30. Light hydrocarbons containing unconverted olefins are withdrawn through line 31 containing heat exchanger 32. This vaporized stream is then combined with strong phosphoric acid passing through line 33, and the mixture is introduced into the top of tower 12 via line 34. The mixture passes co-currently through the packed portion in substantially the same manner as that described in connection with the operation of tower 11.

Tower 12 effluent is withdrawn through line 35 containing heat exchanger 36 wherein the hydrocarbons are condensed. The hydrocarbon and acid phases are then separated in settler 37. The acid layer is withdrawn through line 38 and is passed through line 39, containing heater 40, and then through lines 33 and 34 to tower 12. The hydrocarbon phase is withdrawn through line 41 and is conducted through branch line 42 into a second product separation zone or stabilizer 43. This stabilizer may likewise be a convential distillation zone in which a separation between polymer product, withdrawn through line 44, and unconverted gases, withdrawn through line 45, is effected.

The strong acid used in zone 12 may also lose its strength after prolonged use due to contamination. A portion may be periodically or continuously discarded from the system through branch line 46 containing control valve 47. Fresh make-up strong acid may be added to the system through line 61 containing control valve 62.

In a preferred modification, the spent acid from zone 12 is conducted through branch line 48 containing control valve 49, diluted with water introduced through line 50 containing control valve 51, the water being used in an amount needed to bring the strength of this acid down to that of the weak acid used in zone 11, and combined with the recycled weak acid in line 15. This operation is beneficial for obtaining the maximum useful life of the strong phosphoric acid.

In another modification, the hydrocarbon phase from settler 20 bypasses stabilizer 29 and is passed through line 26 into line 52 containing control valve 53. The total zone 11 hydrocarbon effluent is then conducted through line 31 and heater 32 into zone 12. This manner of operation eliminates the necessity of a stabilizer between the two zones. On the other hand, the strong acid catalysts in zone 12 will sometimes degrade the quality of the first stage polymers as a result of further reaction of the polymers through copolymerization, polymerization with unreacted olefins, etc.

A third method permits the use of only one distillation zone and yet effects intermediate separation of the first stage polymer. Valves 28 and 53 are both closed. The hydrocarbon from settler 20 is passed through line 54 containing valve 55 into line 42 wherein it is combined with the separated hydrocarbon from settler 37. The total hydrocarbon effluents from both zones are then distilled into polymer and unreacted hydrocarbon fractions. The unreacted hydrocarbons withdrawn through line 45 then pass through line 56 containing control valve 57 and heater 58. This feed stream combines with strong acid from line 39 and thence passes through lines 33 and 34 into reaction zone 12. If the original olefin feed stream contains substantial amounts of inert diluents such as paraffins, the hydrocarbons withdrawn through line 45 in this modification will have a lower olefin concentration than is the case in the other modifications. This disadvantage is not too serious, however, since olefin polymerization in the presence of strong liquid phosphoric acids is of a pseudo first order type. Consequently, the extent of polymerization is not very sensitive to olefin concentration and the volume of zone 12 will not have to be increased unduly.

In the event stabilizer 43 is used only for separating zone 12 effluent, unreacted hydrocarbons may be withdrawn from the stabilizer through line 59 containing control valve 60. In some cases, it may be desired to recycle these withdrawn hydrocarbons back through line 56 and thence to reaction zone 12, along with unreacted hydrocarbons from stabilizer 29, if the concentration of unreacted olefins in stabilizer 43 effluent is sufficiently high to warrant this procedure.

The improvements to be obtained in the practice of the present invention will now be illustrated in conjunction with the following example. It is to be understood, however, that this example is not intended to limit the spirit or scope of the invention in any manner not otherwise specified herein.

A series of single stage polymerization runs were made to determine the effect of acid strength on the yield and octane characteristics of the gasoline fraction of the total polymer. The runs were carried out by the procedure described in connection with the operation of one of the reaction zones in Figure 1. The reaction tower was packed with either $\%_{16}$ inch copper pellets or 8–16 mesh granular carbon. In each run acid catalyst and a vaporized $C_3$ hydrocarbon feed containing 58 mol percent propylene were co-currently passed through the acid-flooded tower at an average temperature of 360° F. and a pressure of 500 p. s. i. g. The hydrocarbon feed rate was equivalent to about one liquid volume per volume of reaction zone per hour, and the catalyst recycle rate was 0.7 volume per volume of reaction zone per hour. The liquid catalysts, consisting chiefly of a mixture of ortho and pyro phosphoric acids, ranged in strengths from about 92 to 108% by weight $H_3PO_4$ on a carbon-free basis. Olefin conversions ranged from about 30 to 80% with catalysts having a strength below about 100 weight percent $H_3PO_4$; conversions as high as 97% were obtained with stronger catalysts. All of the olefins that disappeared were converted into polymer.

In each run, the $C_5$ to 430° F. boiling range fraction, corresponding to the portion of the polymer suitable as a gasoline blending agent, was segregated and submitted to a conventional CFR octane determination. The results are given in the curves of Figures 2 and 3 showing plots of acid strength versus gasoline yields, based on total polymer, and CFR octane ratings, respectively. Increasing acid strength from about 92 to 108% by weight resulted in decreasing gasoline yield by about 15% and in reducing octane ratings about 4 units.

These results demonstrate the advantages of the present invention. Two reaction zones are operated in series at approximately the above conditions with acids of the same or of different strength in the zones. Operating conditions in each zone are adjusted to obtain olefin conversions as follows:

| Acid strength, weight percent | Olefin conversion obtained with acid weight percent |
|---|---|
| 92 | 50 |
| 100 | 77 |
| 108 | 97 |

In each run, the polymer is segregated from the first stage effluent before the unreacted olefins are contacted with acid in the second stage. The results are shown in Table I, below:

Table I

| Run No. | $H_3PO_4$ catalyst strength, weight percent | | Total polymer yield, parts per 100 parts of olefins | | | $C_5$–430° F. gasoline fraction of polymer | |
|---|---|---|---|---|---|---|---|
| | First stage | Second stage | First stage | Second stage | Total | Total yield, parts per 100 parts olefin feed | C. F. R. octane rating* |
| 1 | 92 | 92 | 50 | 25 | 75 | 69.7 | 93.8 |
| 2 | 100 | 100 | 77 | 17.8 | 94.8 | 80.5 | 91.0 |
| 3 | 108 | 108 | 97 | 2.9 | 99.9 | 76.8 | 88.2 |
| 4 | 92 | 108 | 50 | 48.5 | 98.5 | 83.9 | 92.6 |

*Weighted average of fractions from both zones.

The use of 108 weight percent of acid in both stages gives a slight advantage in total polymer yield. However, substantially lower yields of gasoline polymer and lower octane ratings of this polymer are obtained in this case than when using weak acid in the first and strong acid in the second stage. When weak acid is used in both stages, a high gasoline octane rating but poor yields of total and gasoline polymer are obtained. To obtain favorable gasoline polymer yields with such weak acids would require prohibitively long contact times and excessively large reactor volumes. The use of 100 weight percent acid in both stages, which is the mean strength of the weak and strong acids, is substantially inferior in all categories to the multi-stage operation using both weak and strong acid.

The liquid acids of phosphorus useful in the practice of the present invention may be any of those known to the art. These include, in addition to ortho phosphoric acids and pyro phosphoric acids, such acids as triphosphoric acid, tetraphosphoric acids ($3H_2O \cdot 2P_2O_5$) and the like, those wherein the phosphorus has a valence of 5 being preferred. A mixture of orthophosphoric and pyrophosphoric acids is particularly preferred because these acids are easily obtained and are relatively inexpensive.

The strength of the weak acids should be below about 100%, preferably in the range of about 70 to 95%, in order to take advantage of the high selectivity to useful gasoline polymers realized with these acids. The strong acid should have a strength above about 100%, preferably in the range of about 105 to 110%, phosphoric acid. It is preferred that the weak acid have a strength of at least 5%, and preferably at least 10%, less than the strong acid.

The reaction conditions used in the various zones will depend to some extent on the desired level of olefin conversion to be obtained therein and on the strength of acid being used. Olefin feed rates may range from about 0.1 to 5.0 liquid v./v./hour. In general, temperatures in both zones will range from about 250° to about 500° F. and pressures may range from about atmospheric up to 750 p. s. i. g. or even higher. Pressures above about 300 p. s. i. g. will usually be required if the acid contains no solubilizing agents, promoters or the like which are conducive to favorable low pressure operations.

It may be necessary to operate at different temperatures and pressures in the various zones. For example, in comparison with the strong acid, more severe conditions are usually required with a weak acid in order to obtain a relatively high level of olefin conversion without resorting to abnormally large reactor volumes. Reaction temperatures in the zones may readily be adjusted by appropriate heating or cooling of the hydrocarbon feed and recycled acid streams. The hydrocarbon effluent from the weak acid zone may be pressurized or depressurized before introduction into the strong acid zone if different pressure conditions are to prevail in them.

It is desirable to maintain a substantially uniform temperature profile throughout the liquid catalyst in both zones in order to achieve substantially isothermal reaction conditions. Suitable temperature control means should be used to remove the exothermic heat of reaction and to maintain uniform temperature. Recycling and cooling of the liquid catalyst, as described above, are quite helpful in this respect.

The fresh olefin feed may be substantially pure individual olefins, mixtures of olefins or mixtures of olefins containing diluents such as paraffinic hydrocarbons and the like. The normally gaseous olefins such as ethylene, propylene, butylenes, etc., are particularly suitable, but the higher olefins may be used. The invention may also be applicable to the polymerization of other unsaturated hydrocarbons such as butadiene, isoprene and the like. Since ethylene is difficult to polymerize, it should generally be present in mixtures containing higher molecular weight olefins. Preferred feed stocks are those containing in the range of about 30 to 70% by weight of $C_3$ and/or $C_4$ olefins, the remainder being $C_3$–$C_4$ paraffins.

The weak and strong acids used in this invention may be the acids of phosphorus per se or may contain various soluble promoters, solubilizing agents or other addition agents to modify the activity thereof. Such materials include the salts of aluminum, zinc, cadmium, nickel, copper and the like which are known in the art. Amounts of these materials in the range of about 2 to 20% by weight, based on the acid, may be used. Particularly suitable addition agents include the various organic phosphates, particularly those having at least one aryl ester group such as mono-cresyl phosphate, although the tri-aryl phosphates such as tri-cresyl phosphate are generally preferred. Mixtures of phosphoric acid with about 5 to 70% by weight of tri-cresyl phosphate, based on the total mixtures, are extremely effective liquid phase catalysts for low pressure operations and have considerably higher activity at low pressures than the phosphoric acid alone.

It will be obvious to the skilled workman that modifications other than those mentioned heretofore may be used in the practice of the present invention without departing from the spirit and the scope thereof.

While the invention has been described in connection with the use of two reaction zones, the aforementioned advantages may also be obtained in operations with three, four or even more zones in which successively stronger acids are used in each zone after the first. For example, three zones using a weak (80%), an intermediate strength (95%), and a strong (105%) acid, respectively, would be advantageous in giving high conversions and selectivities. Preferably, an acid in any subsequent zone should be at least 5% stronger than the acid in the adjacent preceding zone.

What is claimed is:

1. A process for polymerizing normally gaseous olefins to motor fuel blending agents comprising the steps of conducting a mixture of said olefins and liquid phosphoric acid of a strength in the range of from about 70 to 95 weight percent co-currently through a first reaction zone under conditions effecting polymerization of from about 30 to about 80 weight percent of the olefins in the mixture, removing from the first reaction zone a mixture of acid, polymer and unreacted olefins, separating acid from said last named mixture in a first acid settling zone, recycling said separated acid to said first reaction zone in admixture with fresh olefins entering said first reaction zone, conducting the separated mixture of polymer and unreacted olefins to a first product separation zone, separating unreacted olefins from product polymer in said last named zone, conducting separated olefins in admixture with liquid phosphoric acid of a strength in the range of about 100 to 110 weight per cent co-currently through a second reaction zone under conditions effecting substantially complete polymerization of said olefins, removing from the second reaction zone a mixture of polymer and acid, separating acid from last named polymer in a second acid settling zone, recycling separated acid from said second acid settling zone to said second reaction zone in admixture with said unreacted olefins from said product separation zone, and segregating polymers boiling in the motor fuel boiling range from the polymers thus obtained, said acid in each of said reaction zones being maintained as a continuous phase, said acid in said second reaction zone having an acid strength at least 10 weight percent greater than the acid in said first reaction zone.

2. A process as defined by claim 1 wherein a portion of the acid withdrawn from said second acid settling zone is diluted to a strength substantially that of the acid withdrawn from said first acid settling zone and is combined with said last named acid being recycled to said first reaction zone, fresh make up acid of a strength in the range of about 100 to 110 weight percent is added to the acid being recycled to said second reaction zone, and a compensating portion of acid from said first acid settling zone is discarded as spent acid.

3. A process as defined by claim 1 wherein said acid in said first reaction zone has a strength of about 92 weight percent and said acid in said second reaction zone has a strength of about 108 weight percent.

References Cited in the file of this patent

UNITED STATES PATENTS

| | | |
|---|---|---|
| 2,176,354 | Nelson | Oct. 17, 1939 |
| 2,415,951 | Kirkbride et al. | Feb. 18, 1947 |
| 2,620,361 | Karchmer | Dec. 2, 1952 |
| 2,681,374 | Bethea | June 15, 1954 |